United States Patent
Persson (12)

(10) Patent No.: US 6,457,418 B1
(45) Date of Patent: Oct. 1, 2002

(54) CONVEYOR SYSTEM WITH AN OVERHEAD LOAD CARRIER

(75) Inventor: Anders Persson, Borås (SE)

(73) Assignee: OCS Overhead Conveyor System AB, Borås (SE)

( * ) Notice: Subject to any disclaimer, the term of this patent is extended or adjusted under 35 U.S.C. 154(b) by 0 days.

(21) Appl. No.: 09/856,268

(22) PCT Filed: Dec. 7, 1999

(86) PCT No.: PCT/SE99/02298

§ 371 (c)(1),
(2), (4) Date: May 18, 2001

(87) PCT Pub. No.: WO00/34161

PCT Pub. Date: Jun. 15, 2000

(30) Foreign Application Priority Data

Dec. 7, 1998 (SE) .............................................. 9804233

(51) Int. Cl.[7] .............................................. B61B 13/00
(52) U.S. Cl. ............................ 104/166; 104/96; 104/89
(58) Field of Search ................................. 104/165, 166, 104/167, 89, 96

(56) References Cited

U.S. PATENT DOCUMENTS 4,359,000 A * 11/1982 Tokunaga ................... 104/166
4,615,274 A * 10/1986 Hoehn ........................ 104/167
5,829,356 A * 11/1998 Christiansson .............. 104/167

FOREIGN PATENT DOCUMENTS

| CH | 602 450 | 7/1978 |
|----|---------|--------|
| EP | 0 310 511 A1 | 4/1989 |
| EP | 0 335 906 B1 | 11/1989 |
| EP | 0 491 577 A1 | 6/1992 |
| EP | 0 570 262 A1 | 11/1993 |
| WO | WO 95/25656 A1 | 9/1995 |
| WO | WO 97/45348 A1 | 12/1997 |

\* cited by examiner

*Primary Examiner*—Mark T. Le
(74) *Attorney, Agent, or Firm*—Burns, Doane, Swecker & Mathis, LLP

(57) ABSTRACT

The invention relates to an overhead conveyor system which includes a rail, at least one carriage which is provided with wheels and which is adapted to run along the rail and support a load suspended from the carriage, a rotatable drive shaft which extends along the rail and is located perpendicularly above the rail, and a drive arranged on each carriage and adapted to drive, in contact with the drive shaft, the carriage along the rail. The drive includes at least one wheel which is inclined relative to the longitudinal direction of the drive shaft and has a contact surface spring-loaded against the drive shaft, the spring load of the drive being independent of the load suspended from the carriage.

20 Claims, 4 Drawing Sheets

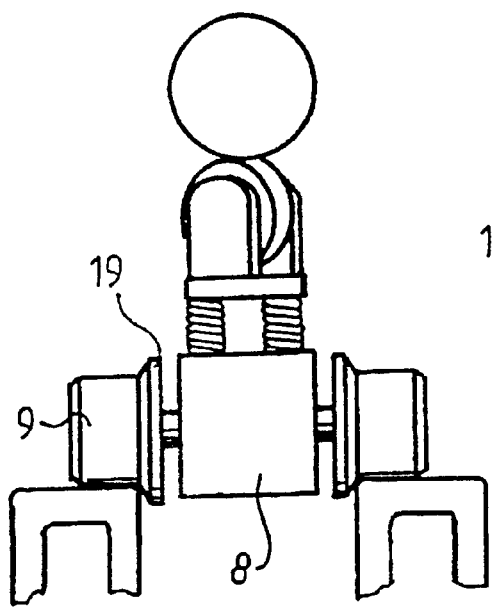
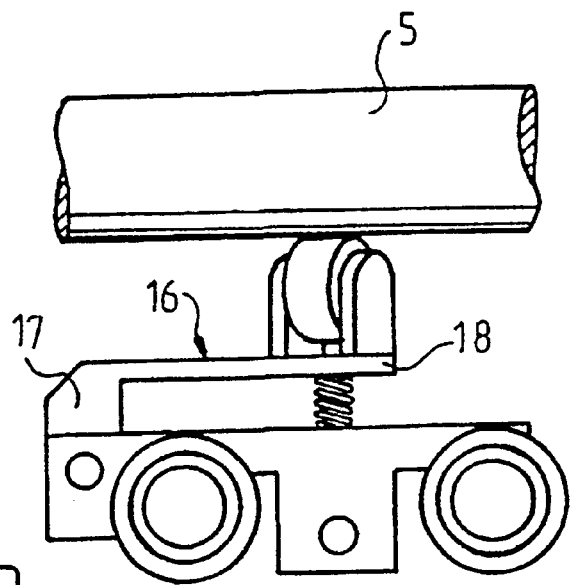
Fig 3A                    Fig. 3B
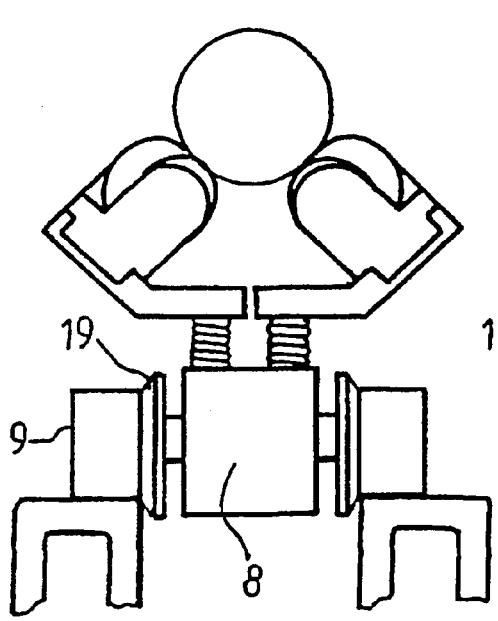
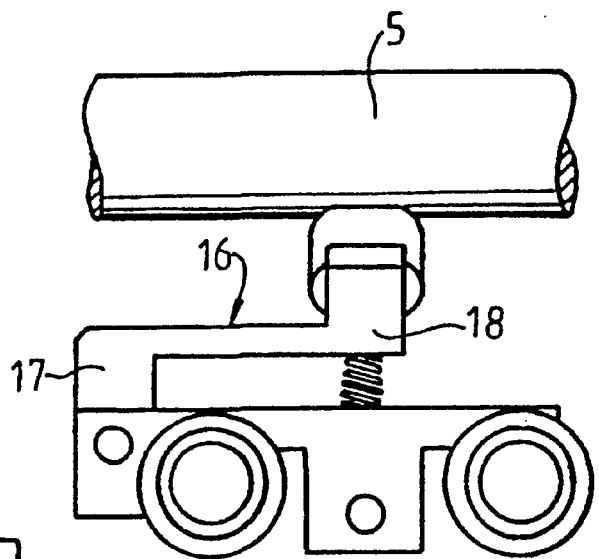
Fig. 4A                   Fig. 4B

CONVEYOR SYSTEM WITH AN OVERHEAD LOAD CARRIER

FIELD OF THE INVENTION

The present invention relates to an overhead conveyor system comprising a rail, at least one carriage provided with wheels, which is adapted to run along the rail and support a load suspended from the carriage, a rotatable drive shaft extending along the rail and located perpendicularly above the rail, and a drive means which is arranged on each carriage and adapted to be brought into contact with the drive shaft and thus propel the carriage.

BACKGROUND ART

It is in many contexts an essential advantage to be able to convey goods above floor level, for example, in production or distribution plants. Overhead conveyor systems are already known for this purpose and are available in various designs.

It is particularly common to convey light goods, such as clothes on hangers, hanging down. Overhead conveyor systems intended for this type of goods, however, are not designed to carry heavy goods, typically weighing 100 kg.

WO95/25656 discloses an overhead conveyor which allows the carrying of heavy loads. The overhead conveyor comprises a track and carriages movable on the track and propelled by means of a threaded rotating spindle which is positioned above the track. The spindle is equipped with alternately threaded, driving portions and smooth, idle portions. The carriages are interconnected in pairs to form units, one of the two carriages of the units being in engagement with a driving portion of the spindle.

The driving performed in this manner implies a mechanically exactly defined connection between carriages and spindle, resulting in strict tolerance requirements.

Since the carriages are interconnected in pairs, the propulsion of these two carriages occurs uniformly. When a carriage enters a threaded portion, it is thus propelled by the other carriage which engages a threaded portion. Therefore the entering must take place without any displacement whatsoever so as to prevent tension and jamming between the engagement surfaces.

Besides, the mechanical connection means that if a carriage belonging to a unit leaves the track or gets stuck, the other carriage in the unit which engages the spindle makes the spindle stop.

It is already known to avoid a mechanical connection between a carriage and a drive shaft in an overhead conveyor, for example, from Applicant's own publication WO97/45348. A cradle is pivotable on its point of suspension so that, when subjected on one side to a downward load, it is pressed upwards on its other side against a rotating drive shaft. On the other side, inclined wheels are arranged, which as the drive shaft rotates propel the cradle.

However, this construction is not intended for heavy loads. The moment which is generated when a load is applied to the cradle and which the device uses for its propulsion, causes a risk of damage to the equipment in case of excessive forces. Moreover, the compressive force acting on the drive shaft is directly proportional to the load, and in case of excessive load there is a risk that the inclined wheels are damaged.

SUMMARY OF THE INVENTION

An object of the present invention is to solve the above problems and provide an overhead conveyor which allows transport of very heavy loads and yet does not have the problematic mechanical connection as described above.

This object is achieved by an overhead conveyor system according to the preamble to claim 1, in which the drive means comprises at least one wheel inclined relative to the longitudinal direction of the drive shaft and having a contact surface which is spring-loaded against the drive shaft, the spring load of the drive means being essentially independent of the load suspended from the carriage.

During rotation of the drive shaft, the inclination of the drive wheels will cause the carriage to be propelled along the rail.

It constitutes an advantage that the major part of the forces acting on the carriage will be taken up by the rail. The compressive force acting on the drive shaft will be essentially independent of the load. The spring load acting on the drive wheels is preferably such that a certain downward flexing of the rail may be compensated for by the resilience. Therefore the propulsion is guaranteed independently of the load. According to an embodiment, a spring means is arranged to press the drive wheels against the drive shaft.

The rail preferably consists of two parallel rail elements, and the wheels of the carriage are preferably arranged in at least one pair, one wheel of the pair running on one rail element, and the other wheel of the pair running on the other rail element. In this way it is guaranteed that the carriage is not turned about its longitudinal axis. The load is suitably carried centrally in the carriage, all wheels being pressed with the same amount of force against the rail elements and stably keeping the carriage on the rail.

According to an embodiment of the invention, the drive shaft alternately has thick portions with a first, greater diameter, and narrow portions with a second, smaller diameter, which are arranged in series along the shaft. Under the narrow portions of the drive shaft, the contact between a carriage supported on the rail and the drive shaft is cancelled since the spring-loaded drive wheels do not reach up to the drive shaft. This means that under the narrow portions of the drive shaft the carriage is not driven, and that it is freely movable in the lateral direction without being obstructed by a contact with the drive shaft.

The transition between portions having different diameters can be continuous, preferably conical. This makes it easier for the drive shaft to begin the driving of a carriage as the carriage is brought into contact with a thick portion of the drive shaft.

Under a portion of the drive shaft with the second, smaller diameter, the rail may have a junction, in which at least one branch rail is connected to the rail. A second drive shaft with the first, greater diameter is suitably arranged above and along the branch rail, which drive shaft at its end nearest the junction tapers towards the end, preferably in a conical manner.

A carriage which is moved into the junction has no drive in this position but can, when moved out on the extension of the rail or on the branch rail, enter a thicker drive shaft portion, in which case the drive means of the carriage are brought into contact with the drive shaft and the carriage is propelled once more.

In the junction the rail can be provided with at least one switching element adapted to continuously join the rail elements of the rail with the rail elements of the branch rail. Like switch points, the junction can thus direct carriages in different directions.

According to the invention, the drive shaft which extends past a junction can thus be continuous, without interruptions, which restricts the number of necessary drive sources. This is a great advantage over overhead conveyor systems where the drive shaft is positioned under the supporting rail. In fact, in these systems the drive shaft must have a discontinuity in connection with each junction, thus requiring a plurality of drive sources.

According to a preferred embodiment, the drive means comprises at least two wheels which are inclined relative to the longitudinal direction of the drive shaft and adapted to be brought into contact with the drive shaft on each side of the centre axis of the drive shaft. Since there is one wheel on each side of the drive shaft, the contact between the drive shaft and the wheels will be more stable. Furthermore the carriage can be driven in the opposite direction with maintained performance.

Suitably the overhead conveyor system comprises at least two carriages, which act upon each other by means of forces directed along the drive shaft. This action can be accomplished, for example, by successive carriages being interconnected in pairs in conveying units. A carriage that has no contact with the drive shaft, for example when positioned in a junction, can thus be driven by being connected with a second carriage which is in contact with the drive shaft.

BRIEF DESCRIPTION OF THE DRAWINGS

The present invention will now be described in more detail with reference to the accompanying drawings, which for the purpose of exemplification illustrate preferred embodiments of the invention.

FIGS. 3a, 3b front view and a side view, respectively of an embodiment of a carriage belonging to the inventive overhead conveyor system.

FIGS. 4a, 4b are a front view and a side view, respectively of a second embodiment of a carriage belonging to the inventive overhead conveyor system.

FIG. 6a shows an actuating device according to the invention, in a position corresponding to the position of the junction in FIG. 5a.

DESCRIPTION OF A PREFERRED EMBODIMENT

Figure 1:
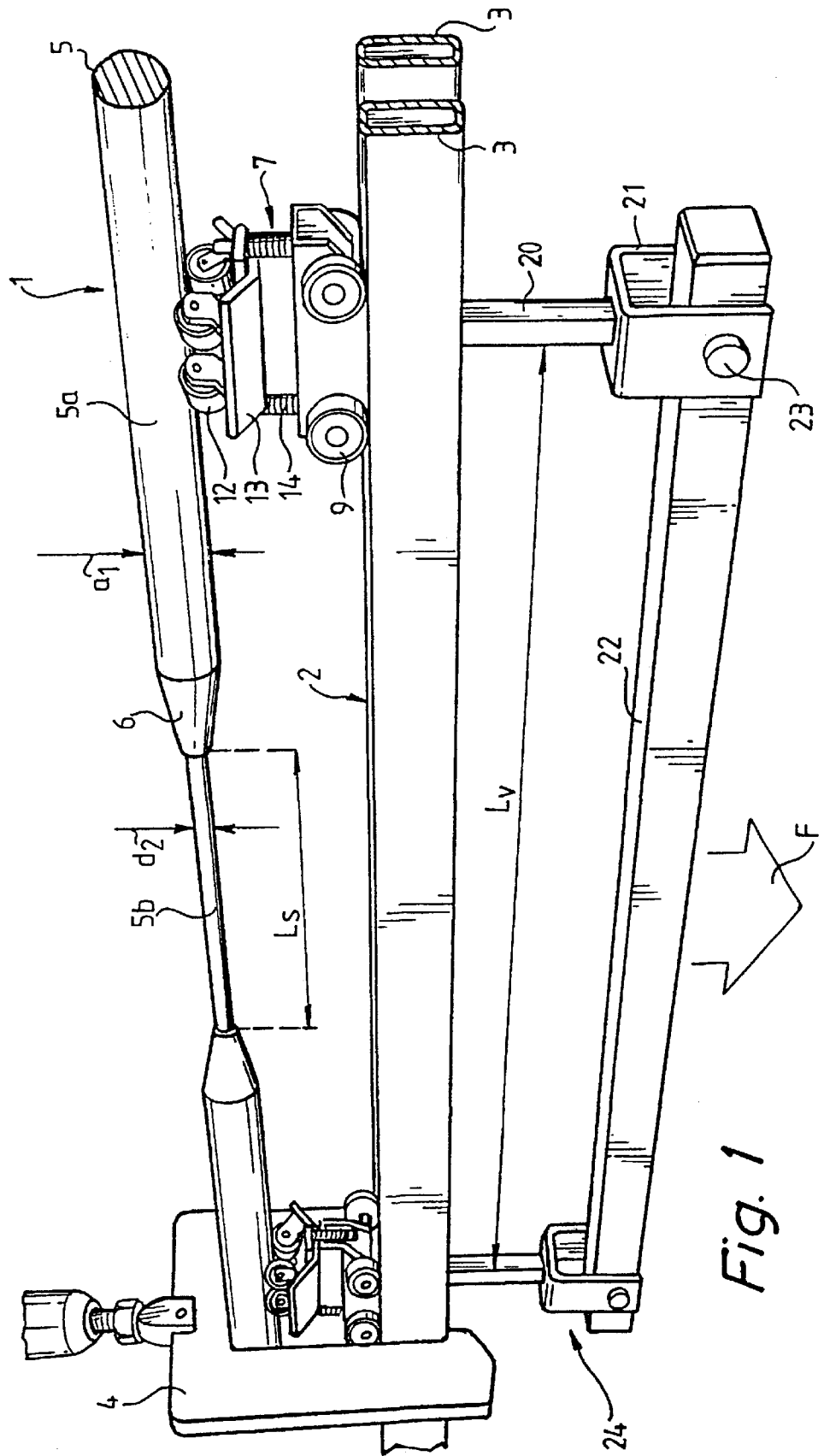
FIG. 1 is a perspective view of an embodiment of the overhead conveyor system according to the invention.

FIG. 1 illustrates an overhead conveyor system 1 according to the invention. A rail 2 consists of two parallel rail elements 3, each rail element consisting of a hollow section of rectangular cross-section. The rail is fixed by means of yokes 4 which are arranged spaced from each other on the outsides of the rail elements and which also are responsible for suspension of the overhead conveyor system 1.

Immediately above the rail 2 and extending along the same extends a rotatable drive shaft 5 which is drivable with the aid of means (not shown) adapted thereto, such as a belt connected to an electric motor. The drive shaft has alternately portions 5a with a first, greater diameter $d_1$, and portions 5b with a second, smaller diameter $d_2$. The transitions 6 between portions 5a, 5b with different diameter are in the example shown conical, so that the transition between the portions occurs continuously.

Along curves, two straight portions of the drive shaft 5 can be connected to a flexible shaft of the type disclosed in EP-335906.

A plurality of carriages 7 are movable along the rail 2. The carriages 7 are positioned between the rail 2 and the drive shaft 5.

Figure 2:
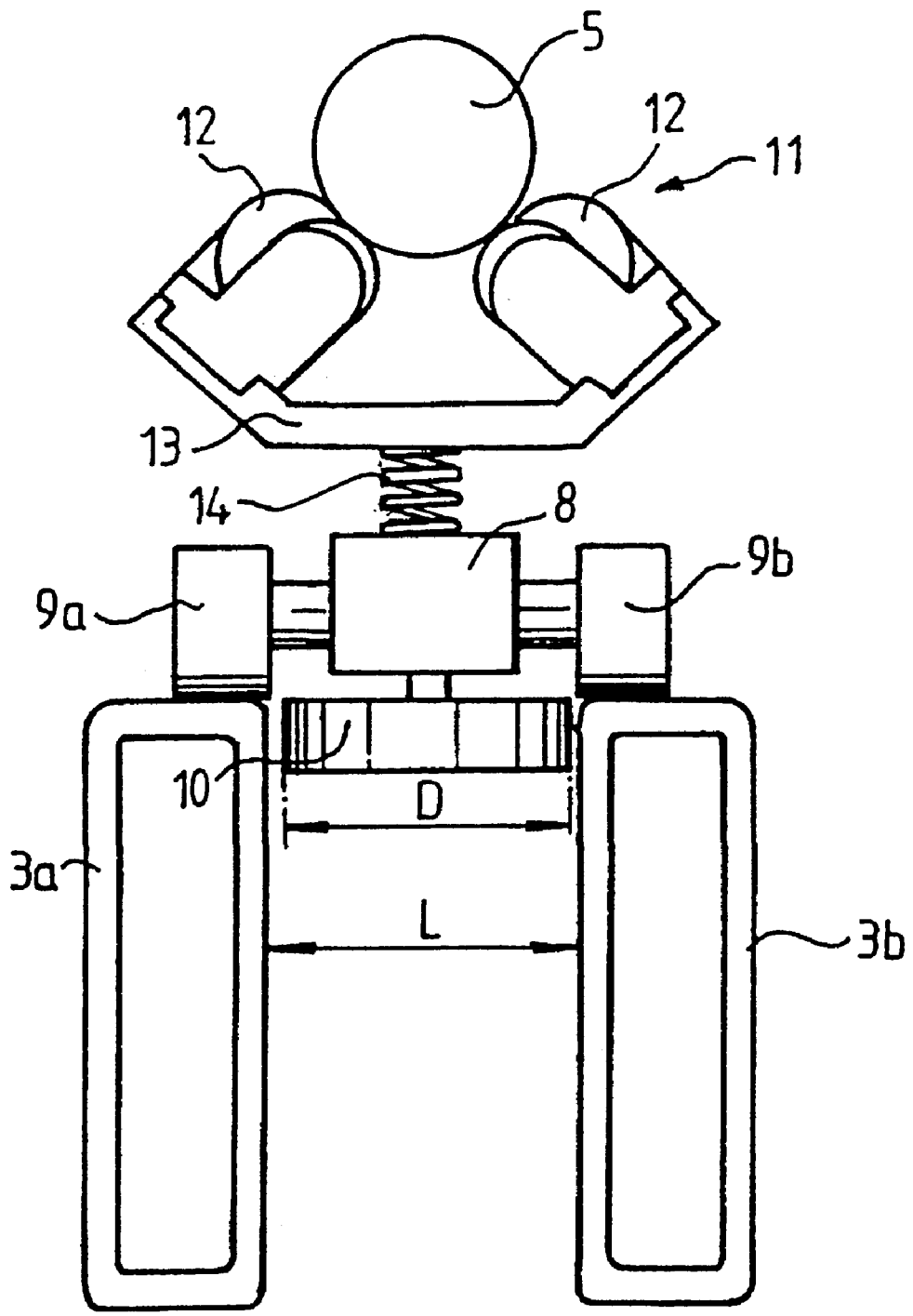
FIG. 2 is a front view of a carriage belonging to the overhead conveyor system in FIG. 1.

FIG. 2 illustrates how each carriage 7 consists of a carriage body 8 with four wheels 9 which are arranged to roll on the two rail elements 3. The wheels 9 are arranged in pairs, one wheel 9a of the pair rolling on one rail element 3a and the other wheel 9b of the pair rolling on the other rail element 3b. Under the carriage body 8 between the rail elements 3, two guide elements, in the example shown guide wheels 10, are arranged to guarantee that in operation the carriage cannot be moved transversely of the rail. Each guide wheel 10 is rotatable in a plane parallel with the contact plane of the carriage wheels with the rail and has a diameter D which is somewhat smaller than the distance L between the rail elements 3.

On the upper side of the carriage body, a drive unit 11 is arranged, consisting of at least one drive wheel 12 which is inclined relative to the longitudinal direction of the drive shaft and which by spring action is pressed towards the drive shaft. In the preferred embodiment as shown in FIG. 2, each carriage has four drive wheels 12 which are arranged in pairs on each side of the drive shaft 5. All wheels are rotatable in suitably parallel planes, i.e. all drive wheels 12 are preferably inclined relative to the drive shaft at the same angle. The wheels are arranged on a cradle 13 which is mounted on the carriage body 8 with the aid of spring means, for example helical springs 14. The drive unit 11 is of such a dimension that when the carriage is positioned under one of the thick portions 5a of the drive shaft, the drive wheels 12 are brought into contact with the circumferential surface of the drive shaft 5, the springs 14 being compressed and the contact surfaces of the drive wheels 12 with the drive shaft 5 being spring-loaded. When the carriage is positioned under one of the narrow portions 5b of the drive shaft, the contact of the drive wheels 12 with the circumferential surface of the drive shaft 5 is cancelled. This is achieved, for example, by the length of the springs 14 being adapted so that, when fully expanded, they are not capable of making the drive unit 11 contact the narrow portion 5b of the drive shaft. Another variant is that the drive unit 11 towards the drive shaft is impeded by an abutment, which prevents the drive unit from being brought into contact with the narrow portion 5b of the drive shaft.

It goes without saying that the number of drive wheels 12 on each carriage may vary and can be, for example, two or even one, as shown in FIGS. 3 and 4. Furthermore the spring action can be accomplished by means of a pivotable element 16 which at one end 17 is articulated to the carriage body 8 and at its other end 18 is resiliently arranged on the carriage body. Instead of guide wheels 10 arranged under the carriage, the wheels 9 can be provided with flanges 19. This is also illustrated in FIGS. 3 and 4.

With reference once more to FIG. 1, a strut 20 is articulated to a first carriage 7 and extends down between the rail elements 3. The strut has at its lower end a yoke 21 in which one end of a beam 22 is arranged by means of a through bolt 23. The other end of the beam is correspondingly connected with a second carriage 7. The construction consisting of the beam 22, the two struts 20 and the two carriages 7 constitutes a conveying unit which in FIG. 1 is designated 24.

The carriages 7 thus have a restricted freedom of movement relative to each other and transfer between each other via the strut 20 and the beam 22 forces that are directed along the rail. Loads F of different kinds can be applied to the beam 22. The conveying unit 24 is dimensioned so that the distance $L_v$ between the carriages 7 is longer than the distance $L_s$, of the narrow portions 5b of the drive shaft 5. In this way at least one of the carriages 7 of the conveying unit 24 is in contact with one of the thick portions of the drive shaft.

As the carriages 7 are moved along the rail 2, the wheels 9 roll on the upper side of the rail elements 3 and support the entire load F which puts weight on the beam 22. The guide wheels 10 on the underside of each carriage (FIG. 7) or alternatively the flanges 19 of the wheels (FIGS. 3 and 4) prevent the carriage from getting stuck crossways or jamming. They also prevent the struts 20 from contacting the rail 2. The carriages 7 are driven by rotation of the drive shaft 5, which rotation is transferred to the inclined wheels 12 as a force directed along the rail.

The load F is completely supported by the rail 2 and does not directly affect the spring load F between the drive wheels 12 and the rail 2. Also if the load F causes a downward flexing of the rail 2 and, thus, an increased distance between the rail 2 and the drive shaft 5, the drive continues to work by the springs 14 compensating for the increased distance.

Figure 5B:
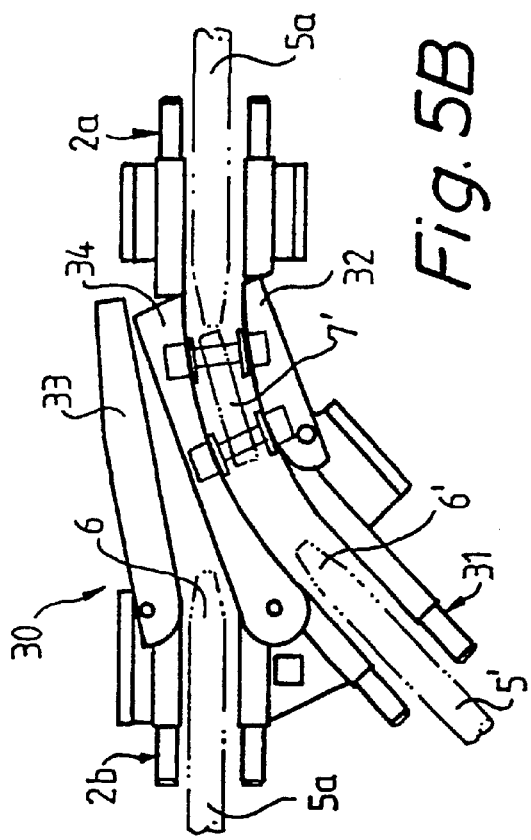
FIG. 5b shows the junction in FIG. 5a in a second position.
Figure 5A:
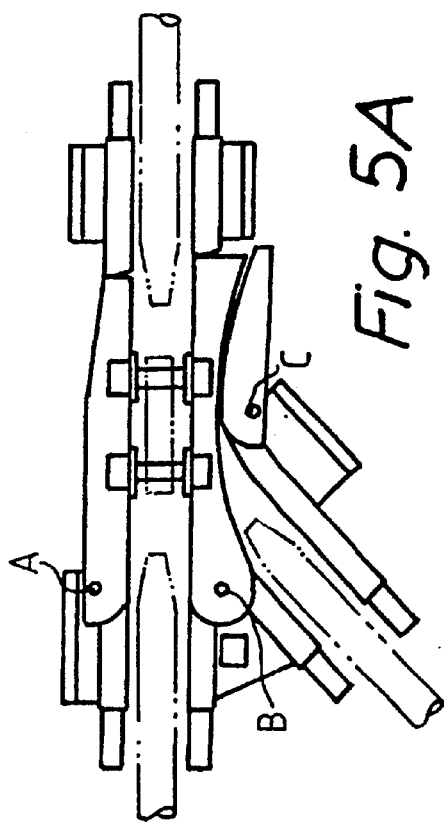
FIG. 5a shows an embodiment of a junction according to the invention in a first position.

As shown in FIGS. 5a, 5b, the rail 2 comprises, when necessary, junctions 30 in which a branch rail 31 is connected to the rail 2. Switching means, in the example shown comprising outer 32, inner 33 and intermediate 34 supporting rail elements, are arranged to join, in a first position (FIG. 5a), a first portion 2a of the rail and a second portion 2b of the rail, and join, in a second position (FIG. 5b), the first portion 2a of the rail with the branch rail 31. In a junction 30 a carriage 7 positioned on the first portion 2a of the rail can thus be moved either onto the second portion 2b of the rail or onto the branch rail 31, depending on the position in which the switching means 32, 33, 34 are located.

Figure 6B:
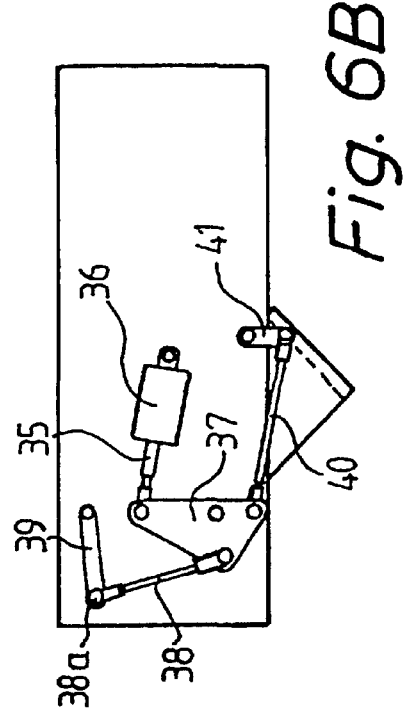
FIG. 6b shows the actuating device in FIG. 6a, in a position corresponding to the position of the junction in FIG. 5b.
Figure 6A:
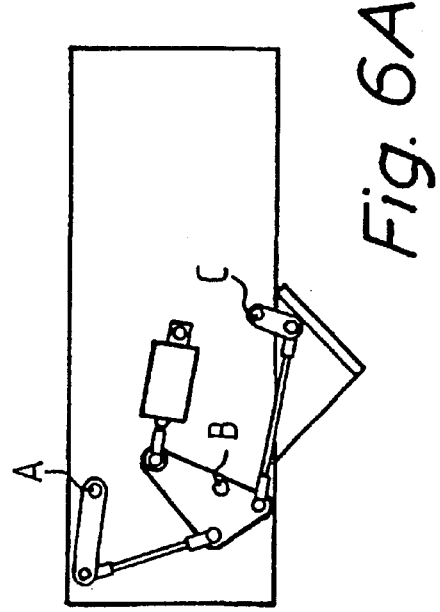

The supporting rail elements 32, 33, 34 are actuatable with the aid of actuating means, in FIGS. 6a and 6b shown as a link arm system 35–41. A displaceable arm 35 of a power means 36 actuates a plate 37 which is turnable in its plane about the point B. A strut 38 is articulated to the plate 37 and at its other end 38a to a link arm 39 which is pivotable on the point A. An analogous combination of strut 40 and link arm 41 connects the plate 37 with the point C.

When the displaceable arm 35 is fully inserted into the power means (FIG. 6a), the plate 37, the struts 38, 40 and the link arms 39, 41 hold the supporting rail elements 32, 33, 34 in such a position (FIG. 5a) that the outer supporting rail element 33 and the intermediate supporting rail element 34 join the first 2a and second 2b portions of the rail. The inner supporting rail element 32 is pivoted away from the track of the rail 2. When the displaceable arm 35 is instead fully pushed out of the power means (FIG. 6b), the plate 37 is turned in its plane about the point B and actuates via the struts 38, 40 the link arms 39, 41 to be pivoted on the points A and C. As a result, the supporting rail elements 32, 33, 34 are pivoted to such a position (FIG. 5b) that the intermediate supporting rail element 34 and the inner supporting rail element 32 join the first portion 2a of the rail with the branch rail 31. The outer supporting rail element 33 is then pivoted away from the track of the rail 2.

As an alternative to the actuating means described above, the outer supporting rail element 33 and the inner supporting rail element 32 are spring-loaded (not shown) and strive to abut against the first portion 2a of the rail. Means (not shown) would then only have to be arranged to move the intermediate supporting rail element 34 between its position in FIG. 5a, where it forces the inner supporting rail element 32 away from the first portion 2a of the rail, and its position in FIG. 5b, where it forces the outer supporting rail element away from the first portion 2a of the rail.

As shown in FIGS. 5a, 5b, the thick portions 5a of the drive shaft are located so that the drive shaft above the junction 30 is narrow. This means that a carriage 7' which is located in the junction has no contact with the drive shaft 5 and thus can be moved transversely of the rail 2 without any resistance exerted by the drive shaft. A carriage 7' which leaves the drive shaft portion thus has no drive when located in the junction 30. The other carriage (not shown) which belongs to the same conveying unit as the carriage 7' is then responsible for the carriage being pulled or pressed inwards towards the next thick drive shaft portion 5a or towards a second drive shaft 5b which is arranged perpendicularly above the branch rail 31. The carriage is thus brought into driving contact with the drive shaft 5 or 5'.

The conical portion 6 or 6' of the drive shaft 5 and 5', respectively, facilitates the engagement of the drive wheels 12 with the drive shaft. As described above, a carriage 7 located under one of the narrow portions 5b of the drive shaft has no contact at all with the drive shaft since the springs 14, owing to their length or by means of an abutment, are prevented from bringing the drive unit 11 into contact with the narrow portion 5b of the drive shaft. When the carriage 7 is moved towards a conical portion 6, the drive wheels 12 are brought into contact with the drive shaft while gradually pressing down the spring-loaded drive wheels. When the drive wheels 12 have been sufficiently pressed down, the drive wheels 12 begin to drive the carriage 7, which contributes to the carriage 7 being moved out onto the thick portion 5a of the drive shaft 5. Thanks to the continuous transition between narrow and thick portions along the drive shaft 5, a carriage located under a narrow portion need be affected but to a very small extent to bring it into driving engagement with the next thick portion.

Thanks to the inventive construction, the conveying unit 24 can also be driven on an upward slope.

The invention is not limited to the above description of preferred embodiments. On the contrary, numerous variations are conceivable within the inventive idea as defined in the claims.

What is claimed is:

1. An overhead conveyor system comprising:
   a rail;
   at least one carriage having wheels and being adapted to run along the rail and support a load suspended from the at least one carriage;
   a rotatable drive shaft extending along and above the rail, the drive shaft alternately having thick portions with a first diameter and narrow portions with a second diameter smaller than the first diameter, the thick and narrow portions being arranged in series along the shaft;
   a drive on the at least one carriage, the drive comprising at least one drive wheel inclined relative to a longitudinal direction of the drive shaft and that has a contact surface adapted to be spring-loaded against the thick portions of the drive shaft independently of the load suspended from the carriage, wherein there is no contact between the drive and the drive shaft when the at least one carriage is positioned directly under one of the narrow portions and supported by the rail so that the carriage is freely movable in a direction lateral of the drive shaft without being obstructed by contact with the drive shaft.

2. An overhead conveyor system as claimed in claim 1, wherein the drive shaft includes a transition portion between thick and narrow portions.

3. An overhead conveyor system as claimed in claim 1, wherein, under a narrow portion of the drive shaft, the rail includes a junction in which at least one branch rail is connected to the rail.

4. An overhead conveyor system as claimed in claim 3, wherein a thick portion of a second drive shaft is arranged above and along the branch rail and the second drive shaft tapers to a smaller diameter proximate the junction.

5. An overhead conveyor system as claimed in claim 3, wherein at the junction the rail is provided with at least one switching element adapted to join the rail with the branch rail.

6. An overhead conveyor system as claimed in claim 1, wherein the rail includes two parallel rail elements, and wherein the wheels of the carriage are arranged in at least one pair, so that one wheel of the at least one pair runs on one rail element and the other wheel of the at least one pair runs on the other rail element.

7. An overhead conveyor system as claimed in claim 1, wherein a spring is adapted to press the at least one drive wheel towards the drive shaft.

8. An overhead conveyor system as claimed in claim 1, wherein the drive comprises at least two wheels which are inclined relative to the longitudinal direction of the drive shaft and are adapted to be brought into contact with the drive shaft opposite sides of a center axis of the drive shaft.

9. An overhead conveyor system as claimed in claim 1, comprising at least two carriages.

10. An overhead conveyor system as claimed in claim 9, wherein the at least two carriages act upon each other by means of forces directed along the drive shaft.

11. An overhead conveyor system as claimed in claim 10, wherein two carriages arranged successively on the rail are interconnected in conveying units.

12. An overhead conveyor system as claimed in claim 2, wherein, under a narrow portion of the drive shaft, the rail includes a junction in which at least one branch rail is connected to the rail.

13. An overhead conveyor system as claimed in claim 4, wherein at the junction the rail is provided with at least one switching element adapted to join the rail with the branch rail.

14. An overhead conveyor system as claimed in claim 2, wherein the rail includes two parallel rail elements, and wherein the wheels of the carriage are arranged in at least one pair, so that one wheel of the at least one pair runs on one rail element and the other wheel of the at least one pair runs on the other rail element.

15. An overhead conveyor system as claimed in claim 3, wherein the rail includes two parallel rail elements, and wherein the wheels of the carriage are arranged in at least one pair, so that one wheel of the at least one pair runs on one rail element and the other wheel of the at least one pair runs on the other rail element.

16. An overhead conveyor system as claimed in claim 2, wherein a spring is adapted to press the at least one drive wheel towards the drive shaft.

17. An overhead conveyor system as claimed in claim 3, wherein a spring is adapted to press the at least one drive wheel towards the drive shaft.

18. An overhead conveyor system as claimed in claim 2, wherein the drive comprises at least two wheels which are inclined relative to the longitudinal direction of the drive shaft and are adapted to be brought into contact with the drive shaft opposite sides of a center axis of the drive shaft.

19. An overhead conveyor system as claimed in claim 3, wherein the drive comprises at least two wheels which are inclined relative to the longitudinal direction of the drive shaft and are adapted to be brought into contact with the drive shaft opposite sides of a center axis of the drive shaft.

20. An overhead conveyor system as claimed in claim 2, comprising at least two carriages.

* * * * *